(12) United States Patent
Thompson

(10) Patent No.: US 12,470,783 B2
(45) Date of Patent: Nov. 11, 2025

(54) METADATA DISTRIBUTION AND MANAGEMENT VIA TRANSACTIONAL BLOCKCHAIN TECHNOLOGY

(71) Applicant: Adeia Guides Inc., San Jose, CA (US)

(72) Inventor: Robert Barr Thompson, Broomall, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/430,348

(22) Filed: Feb. 1, 2024

(65) Prior Publication Data
US 2024/0251141 A1    Jul. 25, 2024

Related U.S. Application Data

(63) Continuation of application No. 16/228,198, filed on Dec. 20, 2018, now Pat. No. 11,924,524.

(51) Int. Cl.
*H04N 21/84* (2011.01)
*G06F 16/48* (2019.01)
(Continued)

(52) U.S. Cl.
CPC ............. *H04N 21/84* (2013.01); *G06F 16/48* (2019.01); *H04L 9/0822* (2013.01); *H04L 9/50* (2022.05); *H04N 21/2351* (2013.01)

(58) Field of Classification Search
CPC ........... G06Q 2220/00; G06Q 20/3829; G06Q 20/389; G06Q 20/382; G06Q 20/405;
(Continued)

(56) References Cited

U.S. PATENT DOCUMENTS 9,137,300 B1 * 9/2015 Marshall ............ H04L 67/1001
10,237,583 B1    3/2019 Allen
(Continued)

FOREIGN PATENT DOCUMENTS

EP     3226165 A1    10/2017
WO  2018213672 A1    11/2018

OTHER PUBLICATIONS

Extended European Search Report in Application No. 19219065.0 dated Mar. 27, 2020.
(Continued)

*Primary Examiner* — Jeremy S Duffield
(74) *Attorney, Agent, or Firm* — HALEY GUILIANO LLP

(57) ABSTRACT

Systems and methods are described for securely distributing metadata using a block chain. The system generates a block for a distributed blockchain ledger such that the block includes an encrypted metadata item of a media asset. The system, at a first time, transmits the block for storage in the distributed blockchain ledger such that a copy of the distributed blockchain ledger is stored by the first computing device and a second computing device. The system generates a smart contract that includes a decryption key for the encrypted metadata item and an identifier of the second computing device. The system transmits the smart contract for storage in the distributed blockchain ledger. The smart contract is configured to be automatically executed at the execution time that is later than the first time, to provide the second computing device with the decryption key for the encrypted metadata item.

4 Claims, 10 Drawing Sheets

(51) Int. Cl.
*H04L 9/00* (2022.01)
*H04L 9/08* (2006.01)
*H04N 21/235* (2011.01)

(58) Field of Classification Search
CPC .. H04N 21/2541; H04N 21/25; H04N 21/254;
H04N 21/2393; H04N 21/2351; H04N
21/235; H04N 21/237; H04N 21/435;
H04N 21/4353; H04N 21/462; H04N
21/4622; H04N 21/84; H04L 2209/38;
H04L 9/3239; H04L 9/0637; H04L
9/0643; H04L 9/3236; H04L 9/0618;
H04L 9/0822; H04L 9/0819; H04L
9/0816; H04L 9/08; H04L 9/50; H04L
67/1097; H04L 67/10; G06F 16/27; G06F
16/48
See application file for complete search history.

(56) References Cited

U.S. PATENT DOCUMENTS

| | | | |
|---|---|---|---|
| 10,417,219 B1* | 9/2019 | Yang | G06F 16/2379 |
| 11,924,524 B2 | 3/2024 | Thompson | |
| 2008/0170689 A1 | 7/2008 | Boubion et al. | |
| 2015/0245103 A1 | 8/2015 | Conte | |
| 2015/0382061 A1* | 12/2015 | Maisenbacher | H04N 21/4542 725/28 |
| 2017/0116693 A1 | 4/2017 | Rae et al. | |
| 2017/0220815 A1 | 8/2017 | Ansari et al. | |
| 2017/0277909 A1 | 9/2017 | Kraemer et al. | |
| 2017/0279783 A1 | 9/2017 | Milazzo et al. | |
| 2018/0041571 A1* | 2/2018 | Rogers | H04L 67/104 |
| 2018/0089651 A9 | 3/2018 | Lund et al. | |
| 2019/0028278 A1* | 1/2019 | Gilson | H04L 63/061 |
| 2019/0050854 A1 | 2/2019 | Yang et al. | |
| 2019/0188399 A1 | 6/2019 | Palaniappan et al. | |
| 2019/0296907 A1* | 9/2019 | Versteeg | H04L 9/50 |
| 2019/0320037 A1* | 10/2019 | Nair | G06Q 50/01 |
| 2020/0125661 A1* | 4/2020 | Albright | H04L 9/50 |
| 2020/0136815 A1 | 4/2020 | Trevethan | |
| 2020/0159891 A1* | 5/2020 | Patel | G06F 21/16 |
| 2020/0162266 A1* | 5/2020 | Miller | H04L 9/3239 |
| 2020/0167318 A1 | 5/2020 | Saunders et al. | |
| 2020/0175590 A1* | 6/2020 | Huo | H04L 9/50 |
| 2020/0177579 A1 | 6/2020 | Allen | |

OTHER PUBLICATIONS

International Search Report and Written Opinion in PCT/US2019/067827 dated Mar. 30, 2020.

* cited by examiner

METADATA DISTRIBUTION AND MANAGEMENT VIA TRANSACTIONAL BLOCKCHAIN TECHNOLOGY

CROSS-REFERENCE TO RELATED APPLICATION

This application is a continuation of U.S. patent application Ser. No. 16/228,198, filed Dec. 20, 2018, the disclosure of which is incorporated by reference in its entirety.

BACKGROUND

The present disclosure relates to improved computerized metadata storage and transmission systems and methods, and more particularly, to techniques for transferring metadata using a distributed blockchain ledger.

SUMMARY

Due to the large growth of media consumption, access to information related to media content (metadata) is essential. For example, content providers often need up-to-date verified metadata in order to properly configure Electronic Programming Guides (EPGs) and Over-The-Top (OTT) streaming websites and applications to provide users with an ability to select and record media content. For these reasons, computerized data storage and transmission applications commonly face a task of transferring metadata (e.g., metadata of media content) between systems and databases.

In one approach, such metadata is transferred directly from one database (e.g., a database of a content provider) to another database (e.g., a database of a media content distributor) via periodic updates. However, such periodic updates have several deficiencies. First, metadata may be incomplete or out-of-date between updates. Second, large periodic updates may consume a large amount of bandwidth in a short period of time, thus increasing the possibility of error. Third, scheduled periodic updates do not provide a guarantee that potentially critical data will, in fact, be delivered on time. Moreover, bulk periodic updates are insecure, as any kind of data breach will compromise a large amount of data.

In one common scenario, a media content creator wishes to distribute certain metadata that contains a spoiler, while a media content distributor needs assurance that the metadata will delivered on time, such that an EPG or OTT streaming websites are timely updated. The periodic update technique does not allow the media content provider to distribute the metadata ahead of time because the spoiler would be revealed. Worse, the late and uncertain delivery of the metadata puts the media content distributor at risk of not being able to timely generate the EPG or configure the OTT streaming website.

To address these deficiencies, a data transfer application (DTA) uses a combination of distributed blockchain ledger (DBL) and a smart contract to solve the problems of the aforementioned approach and allow databases to share metadata securely, timely, and with assurance. To that end, the DTA (e.g., executing on a computing device of a media content creator), encrypts the metadata item that is to be shared and generates a blockchain block that includes the encrypted metadata item. The DTA transmits the block for storage in the DBL at a first time (e.g., well ahead of when the metadata item will be needed). As will be explained below, multiple copies of the DBL may be stored by multiple devices including a computing device of a media content creator and a computing device of a media content distributor. Optionally, other computing devices may also store copies of the DBL. Such distributed storage provides redundancy and data security, as no single actor can change the content of the DBL.

Advantageously, once the block is placed in the DBL, any device with access to the DBL is able to access all data contained in the block. However, because the metadata item of the block is encrypted, devices without a necessary decryption key are unable to access the metadata item in unencrypted form (e.g., in plain text). To enable other devices to access to the metadata item in unencrypted form (e.g., in plain text), the DTA may generate a smart contract for accessing the metadata item from the block. For example, the smart contract may be generated in response to receipt of payment or subscription information. In some embodiments, the smart contract includes a decryption key for the encrypted metadata item and an identifier of the second computing device (e.g., an address or ID of the computing system of a media content distributor).

The DTA may transmit the smart contract for storage in the DBL (e.g., as part of the block or as part of another block). Once the smart contract is stored on the DBL, its execution is assured and is no longer controlled by the creator of the block. For example, the smart contract may include a time of execution. Once the time of execution is reached, any computing system with access to the DBL may execute the smart contract. For example, the smart contract may be configured to be automatically executed at the execution time (e.g., time that is later than the first time when the block was transmitted to the blockchain). Once the smart contract is executed, it may provide the decryption key for the encrypted metadata item to the device that is identified in the smart contract (e.g., to the computing system of the media content distributor). In this way, metadata items are delivered ahead of time, without the need for bandwidth-demanding periodic transmissions. Advantageously, the media content distributor is assured that the metadata item will be available timely (e.g., at the time of execution). As another advantage, the media content provider is assured that the metadata item will not be available ahead of time (e.g., when the metadata item includes a spoiler.)

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
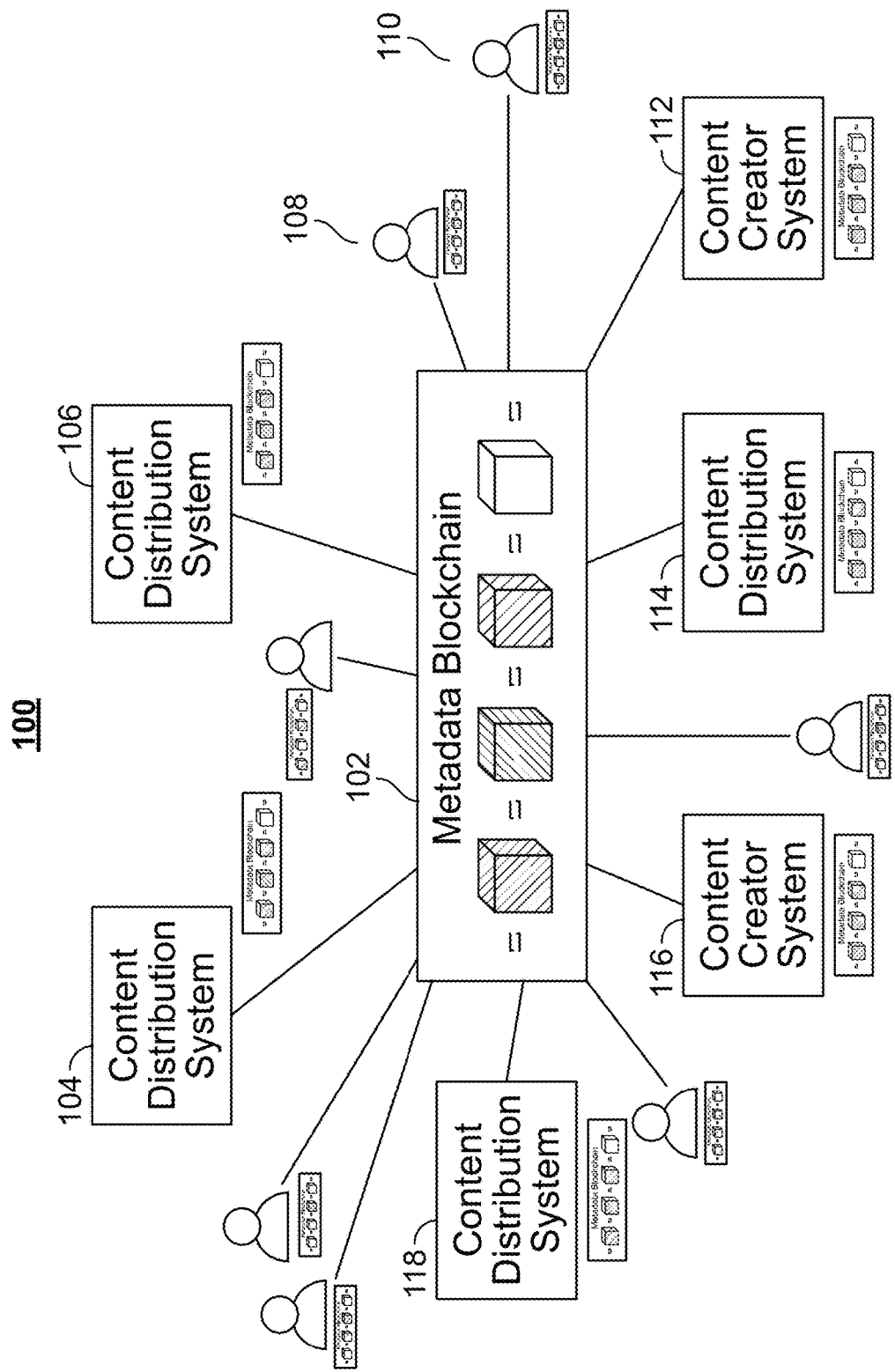
FIG. 1 shows an illustrative example of a distributed blockchain ledger, in accordance with some embodiments of the disclosure.

FIG. 1 shows an illustrative example of a distributed blockchain ledger, in accordance with some embodiments of the disclosure. In particular, FIG. 1 shows an exemplary blockchain system 100 that includes multiple computing devices (that may be referred to herein as "community") that have access to distributed blockchain ledger (DBL). For example, the community may include a computing system of content creators or providers 112, 116, computing systems of content distributors 104, 114, 106, 118, as well as computing system of other users 108, 110. Content creator systems 112, 116 (e.g., system of HBO, Marvell Studios, etc.) may store newly created media content items and associated metadata items. Content distributor systems 104, 114, 106, 118 (e.g., Netflix, Amazon, Spotify, Apple Music, Pandora, etc.) may receive the media content items and distribute them to end users (e.g., users 108, 110).

The community may have access to metadata DBL 102. In one implementation, each member of the community 104-118 may store a local copy of DBL 102. The local copies may be updated via continuous or peridot peer-to-peer communications between community members 104-118. The integrity of the blockchain may be verified by examining blocks of DBL 102 that are linked by a sequence of hashes (e.g., as described with respect to FIG. 5).

DBL 102 may be used to store metadata information for a set of media content items (e.g., movies, TV shows, audio items, multimedia items, etc.). Some members of the community 104-118 may have an ability to add new or modified metadata information to DBL 102. For example, content creator (or provider) device 112 may intend to add information to the DBL 102 that describes: title, actors, and date of release of a new "Game of Thrones" episode. In another example, content creator (or provider) device 112 may intend to add information to the DBL 102 that describes: track length, title, and artists of a music album "The Dark Side of the Moon." To do so, content provider device 112 may generate a new block that includes the new metadata information and store the new block in its copy of DBL 102.

The new block may then be propagated to other members of the community 104-118. In one embodiment, the new block is verified by consensus of the community (e.g., by checking the correctness hash chain of DBL 102). In response to the new block being verified, it is added to all local copies of the blockchain by members of the community 104-118. In some embodiments, only some users (e.g., content creators) may be trusted to produce new metadata blocks. In this case, each new block may be securely cryptographically signed by the creator. The community may then verify the signature and reject new blocks from dis-trusted users. Operation of system 100 aims to build trust between users, promote quick delivery of metadata curation/enhancement in a community, and simplify metadata distribution in general.

Figure 2:
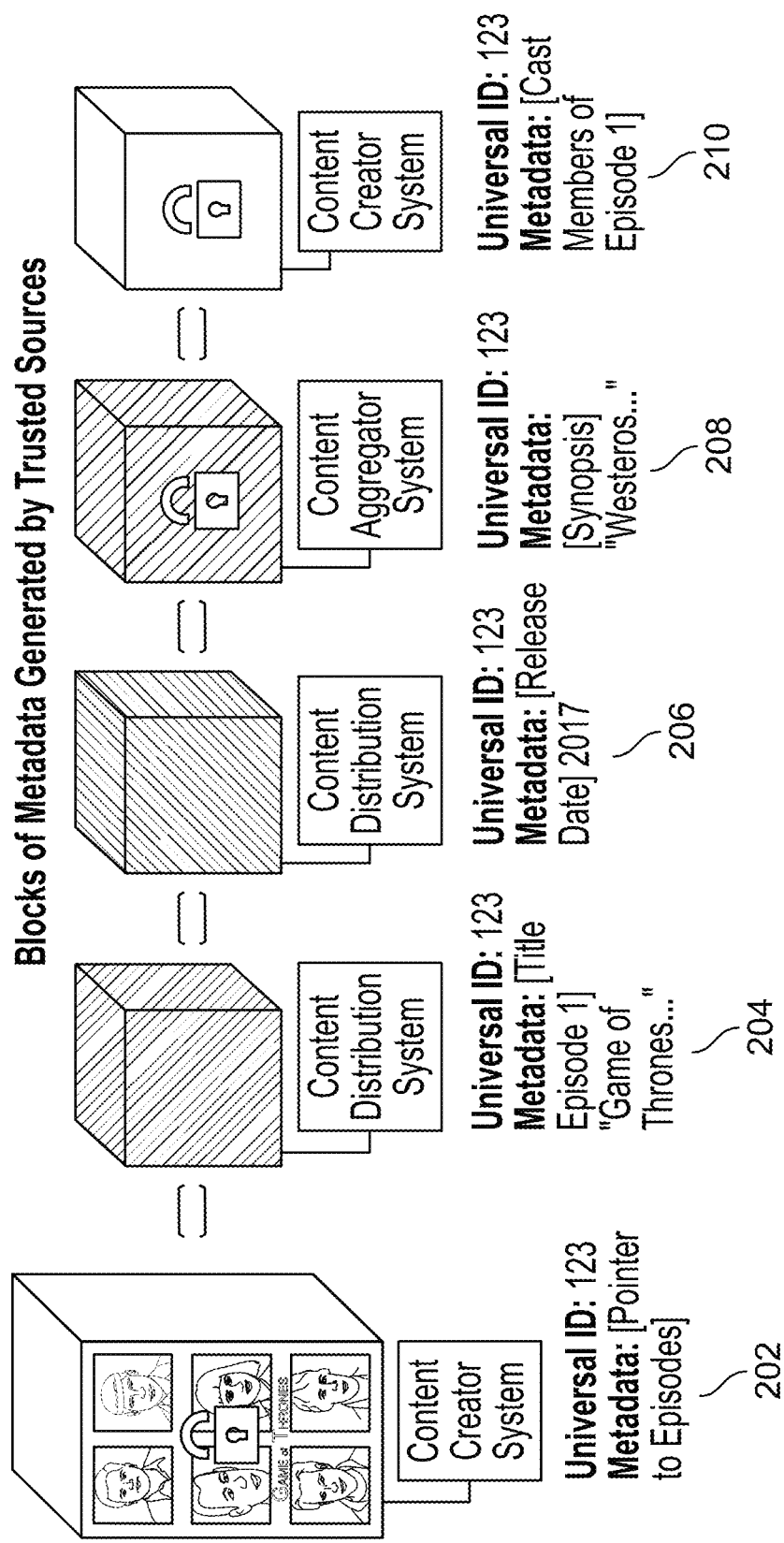
FIG. 2 shows another illustrative example of a distributed blockchain ledger, in accordance with some embodiments of the disclosure.

FIG. 2 shows another illustrative example of a distributed blockchain ledger, in accordance with some embodiments of the disclosure. In particular, FIG. 2 shows an exemplary distributed blockchain ledger (DBL) 200 that includes blocks generated by multiple computing devices (that may be referred to herein as "community"). In some embodiments, DBL 200 is the same as DBL 102 of FIG. 1.

FIG. 2 demonstrates use of universal ID to store metadata for particular media content items (e.g., for episodes of the show "Game of Thrones.") In the shown example, a first media content creator or provider (e.g., HBO) may have generated an "origin" block 202 that includes payload that contains metadata identifying an episode (e.g., first episode) of the show "Game of Thrones" and containing pointers (e.g., hyperlinks) to blocks that contain metadata for those episodes. In another example (not shown), the same technique may be used to distribute metadata for a music asset. For example, media content creator or provider (e.g., Abbey Road Studios) may generate a block that includes payload that contains metadata identifying a music album (e.g., "The Dark Side of the Moon") and containing pointers (e.g., hyperlinks) to blocks that contain metadata for tracks of that album.

Another content destruction system may generate block 204 that includes payload with data that identifies the title of the first episode of the show "Game of Thrones" (e.g., "The Winter is coming"). Another content distributor may have generated block 206 that includes a payload with data that identifies the release date of the episode (e.g., "2017"). A content aggregator (e.g., IMDB) may have generated block 208 that includes a payload that has a detailed synopsis of the episode. The content provider may have additionally generated block 210 that includes a payload with data that identifies a list of the cast in the first episode of the season.

In some embodiments, all blocks 204-210 may be distributed to DBL 200, such that all members of the community have access to all blocks at all times. Although all members of the community have access to the blockchain, certain blocks (e.g., blocks 208 and 210) may contain a payload that is encrypted and may be accessed only by systems authorized to view the metadata (as will be discussed in relation to smart contracts below).

In one implementation, all blocks have the same Universal ID (e.g., "123"). The universal ID can allow any member of the community to easily search for and access all metadata for a particular media asset (e.g., a movie, a TV show, an audio item, a multimedia item, etc.). For example, Universal ID "123" may uniquely identify the first episode of the show "Game of Thrones." The Universal ID can also be used to acquire additional data not stored in DBL 200. For example, a member of the community may access a third-party database, input the universal ID and receive additional data associated with that universal ID. In this way, any member of the community may easily access and view all available metadata related to the first episode of the show "Game of Thrones" (e.g., as described in FIG. 9).

Figure 3:
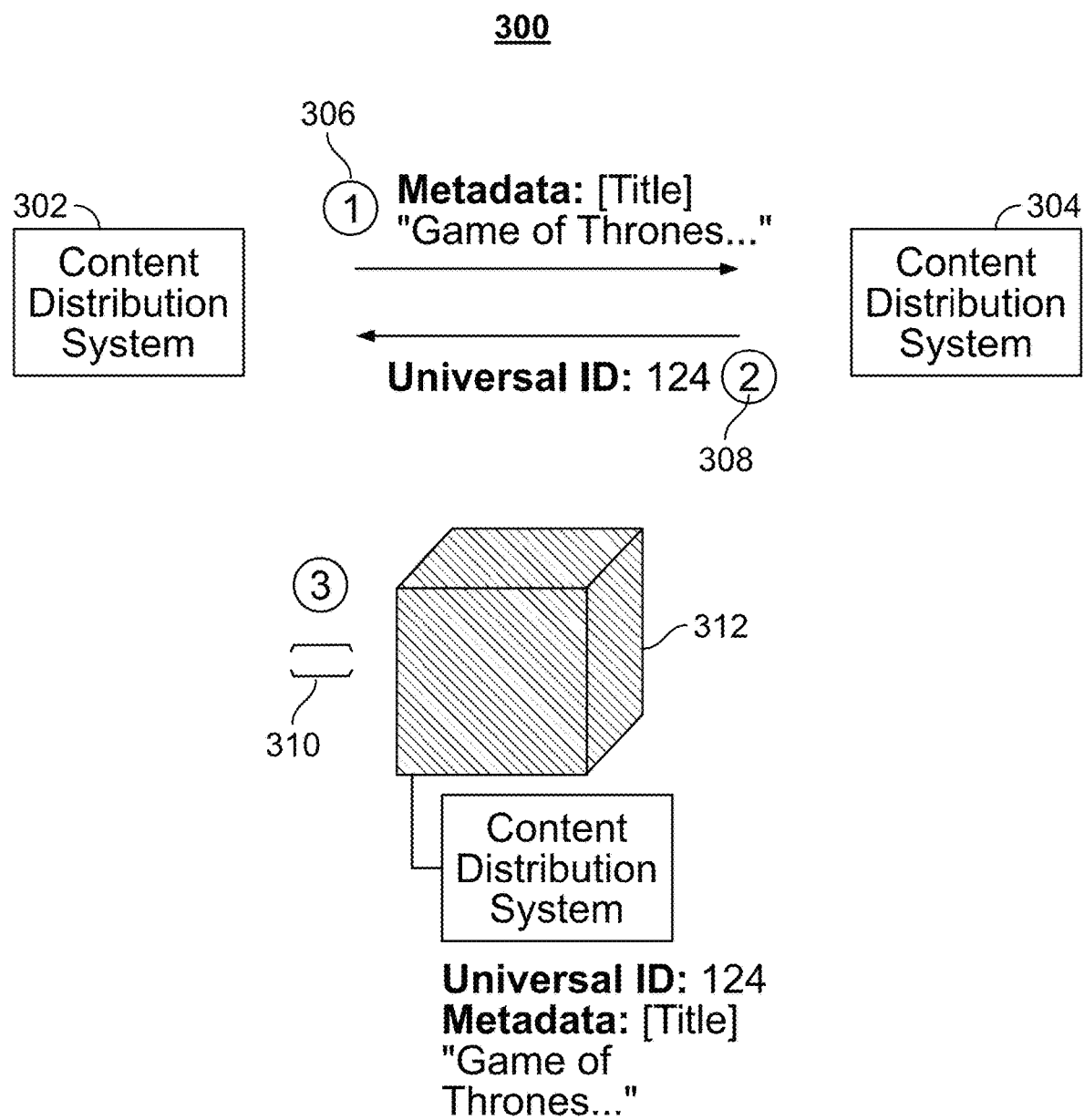
FIG. 3 shows an illustrative example of metadata transfer using distributed blockchain ledger, in accordance with some embodiments of the disclosure.

FIG. 3 shows an illustrative example 300 of metadata transfer using distributed blockchain ledger, in accordance with some embodiments of the disclosure. In particular, several steps may be taken by content creator system 302 to store new metadata in a DBL: (e.g., DBL of FIGS. 1 and 2). At 306, content distribution system 302 may transmit a conventional identifier of a media content item (e.g., the title) to a content distributor system 304. In this example, content distribution system 304 acts as a central authority for universal IDs. At step 308, content distribution system 304 may generate or identify an appropriate universal ID based on the received conventional identifier and transmit it to content distribution system 302.

At 310, content distribution system 302 may generate block 312, such that it includes both metadata to be stored and the universal ID received from content distribution system 304. Advantageously, the use of the central authority to provide universal IDs ensures that relevant metadata is easy to find and that the metadata items (generated by different members of the community) related to the same media asset (e.g., having the same title) are not stored on the blockchain under different identifiers. In some embodiments, block 312 may be verified by the community before it can be added to DBL. For example, the verification may be performed using digital signatures. Content distribution system 302 may encrypt a portion of the block (e.g., the universal ID) using a private key associated with content distribution system 302. All members of the community may have the public key associated with the private key. Thus, successful decryption of the universal ID using the public key would signify that the block's contents are authentic. When enough members (e.g., 50 percent) have performed the verification, the block is added to DBL.

Figure 4:
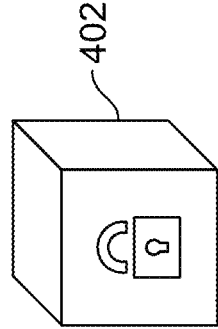
FIG. 4 shows an illustrative example of a smart contract transfer using distributed blockchain ledger, in accordance with some embodiments of the disclosure.
Figure 4:
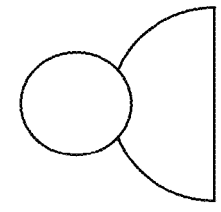
Figure 4:
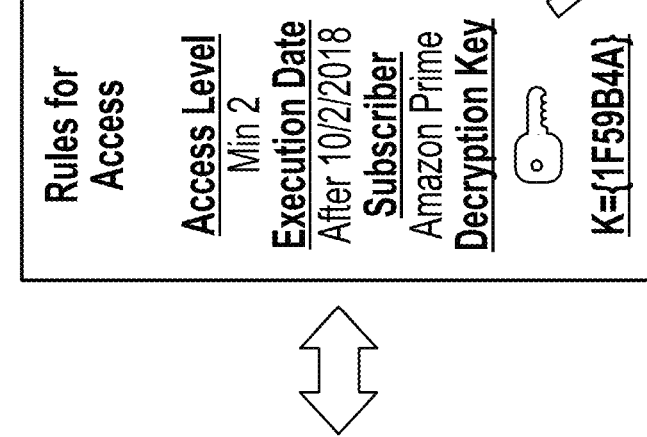

FIG. 4 shows an illustrative example 400 of a smart contract transfer using distributed blockchain ledger, in accordance with some embodiments of the disclosure. In particular, smart contract 406 may be used by a content creator system to provide access to a payload of block 402 to user 404 (e.g., to a media content distributor system or to a device of an end user). In some embodiments, smart contract 406 contains executable sources code which, when executed, carries out the steps specified by the smart contract.

As noted before, certain blocks of the metadata DBL may be encrypted by the creators of the blocks (sometimes only the payload portion of the block may have been encrypted). For example, a content creator system may generate block 402 that included a payload identifying names of the cast members in the final episode of a season (e.g. an episode of "Game of Thrones"). In another example, the payload may identify identities of artists who have cameo parts in a music album. The listing of cast members is sensitive data (e.g., a spoiler) as it may indicate which characters survive and which don't. The listing of cameo artists may also be a spoiler. The content creator may desire for such information not be released ahead of a certain date. To solve this problem, the content creator system may generate smart contract 406 (e.g., a self-executing contract) with various conditions (e.g., user identity, cost, time, access level, etc.) that service providers, such as other systems with access to the DBL, will need to satisfy before gaining access to the sensitive metadata (e.g., to update their system EPGs or OTT web portals).

In some embodiments, smart contract 406 may be stored in the DBL as part of block 402 or as part of another block. In the shown embodiment, smart contract 406 includes an access level requirement (e.g., level 3), an execution date (Oct. 2, 2018), subscriber data (e.g., "Prime"), and the decryption key that can be used to decrypt contents of block 402 (e.g., key K). The key K itself may be encrypted with a key encryption key.

Upon execution of the smart contract (e.g., at the execution date), a decryption key needed for accessing encrypted block 402 is provided to authorized subscribers. For example, encrypted block 402 which included cast member's data may include a smart contract authorizing a delivery of a decryption key only after a certain date, and only to certain users. From the perspective of the content creator system, this ensures that the cast list is not leaked before, the execution certain date. From the perspective of other users (e.g., content distributor system), this ensures that the relevant metadata is guaranteed to be accessible at the certain date and the EPG and the OTT web portal are updated in time.

Once the conditions of smart contract 406 are satisfied (e.g., after the execution date), the execution of smart contract 406 (e.g., performed by any system with access to the DBL), the decryption key may be provided by smart contract 406 to the system specified by smart contract 406 (e.g., to all community members of level 2 or more). For example, system 404 may provide its credentials (e.g., access level and verified current date) to the smart contract stored on the DBL (e.g., as function input or as remote call input) and receive the decryption key by execution of the code of the contract. System 404 may then use the key to decrypt a payload of block 402 and acquire unencrypted (e.g., plain text) metadata 408. In this case, a third-party middleman is not needed because all members of the community will have access to the smart contract ensuring that the smart contract cannot be changed and will be executed when the conditions are met. In some embodiments, the smart contract, at a time of execution, may acquire key decryption from a third-party party escrow system. In another embodiment, the key of the smart contract may be self-decrypting, but only on the date of contract execution.

All members of the DBL community (such as system 404) that have access to the DBL may be able to decrypt blocks of the metadata based on whether they are authorized to access the metadata (e.g., after paying a subscription fee). For example, certain metadata such as a detailed synopsis, a list of cast members of future episodes, etc., may be classified as premium metadata. An additional smart contract may be generated between the content creator system and systems of other users to determine access rights. For example, the content creator system may assign access levels to other systems based on a received payment (e.g., monthly plans). For blocks that are unencrypted, the access level may be "free" and therefore anyone with access to the DBL may be able to access that data as soon as it is added to the DBL. For blocks that are encrypted, decryption keys may be provided to systems that are associated with premium subscribers with an appropriate access level via execution of a smart contract. For example, an appropriate smart contract may be created and added to the DBL as soon as the subscription fee is received. Each user system may maintain its own digital wallet of such decryption keys to seamlessly access metadata from encrypted blocks that it is authorized to access.

Figure 5:
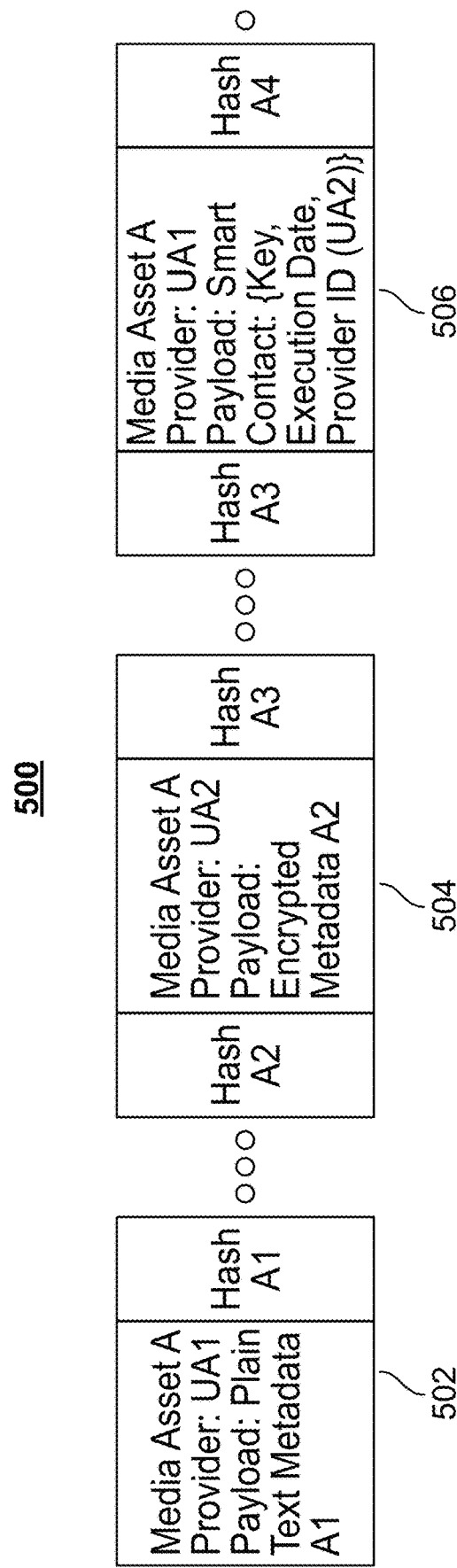
FIG. 5 shows another illustrative example of a distributed blockchain ledger, in accordance with some embodiments of the disclosure.

FIG. 5 shows another illustrative example of a distributed blockchain ledger (DBL) 500, in accordance with some embodiments of the disclosure. For example, DBL 500 may be the same as the DBL of FIG. 1 or FIG. 2. Only three blocks are shown; however DBL 500 may include any number of blocks.

DBL 500 is used to store metadata information for media asset A. For example, block 502 may include a payload that includes an individual identifier for media asset A. The payload may also include ID of the creator of the block (UA1). The payload may also include unencrypted (e.g., plain text) metadata A1 related to media asset A. Furthermore, block 502 may include a hash A1 generated based on the entirety of payload of block 502.

Block 504 may include hash A2 (e.g., the same hash as hash A1). For example, block 504 may include a payload that includes an individual identifier for media asset A. The payload may also include an ID of the creator of the block (UA2). The payload may also include encrypted text metadata A2 related to media asset A. Furthermore, block 504 may include a hash A3 that is based on the entirety of payload of block 504 and on hash A2.

Block 506 may include hash A3 (e.g., the same hash as the hash of block 504). For example, block 506 may include a payload that includes an individual identifier for media asset A. The payload may also include the ID of the creator of the block (UA1). The payload may also include smart contract for media asset A. The smart contract may include a decryption key, an execution date, and an ID of a system that is the beneficiary of the contract (e.g., UA2). Furthermore, block 506 may include a hash A4 that is based on all the payload of block 506 and hash A3. In some embodiments, the smart contract may be used to provide the key to system UA2.

The chaining of hashes as described above ensures that the blockchain cannot be modified by any entity, as other entities will be able to recompute hashes and verify that all hashes in blockchain are correct. For example, if any payload is tempered with, a correct hash would not be computed based on the tempered payload, leading to the discovery if the tempering.

Figure 6:
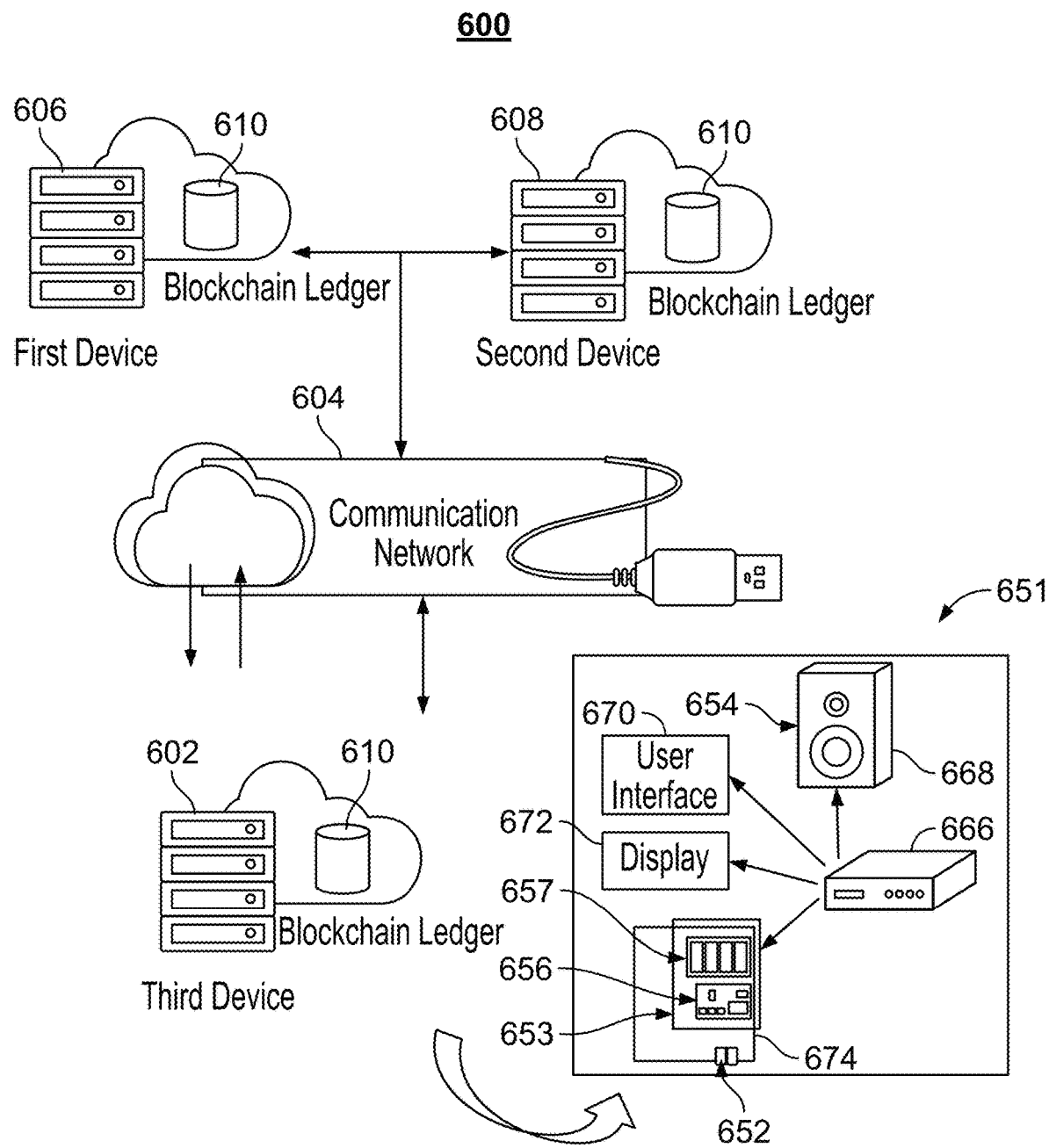
FIG. 6 is a block diagram of an illustrative data retrieval system, in accordance with some embodiments of the disclosure.

FIG. 6 shows generalized embodiments of a system that can host a data transfer application (DTA), in accordance with some embodiments of the disclosure. In system 600, there may be multiple devices, but only three devices are shown in FIG. 6 to avoid overcomplicating the drawing. Third device 602 may be coupled to communication network 604. Third device 602 may be any type of a computing device, such as a server, a desktop, a tablet, a smartphone, any other computing device or any combination thereof. Communication network 604 may be one or more networks including the Internet, a mobile phone network, mobile voice or data network (e.g., a 4G or LTE network), cable network, public switched telephone network, or other types of communication network or combinations of communication networks. First device 606 (e.g., a server of content creator system), second device 608 (e.g., a server of content destructor), and third device 602 may be connected to communication path 604 via one or more communication paths, such as a satellite path, a fiber-optic path, a cable path, a path that supports Internet communication (e.g., IPTV), free-space connections (e.g., for broadcast or other wireless signals), or any other suitable wired or wireless communication path or combination of such paths.

Although communication paths are not drawn between device 602, first device 606 and processing server 608, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 604.

System 600 includes first device 606 coupled to communication network 604. There may be more than one of first device 606, but only one is shown in FIG. 6 to avoid overcomplicating the drawing. First device 606 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. First device 606 may be a server of a content creator. For example, first device 606 may store newly created or old media content and accompanying metadata.

The DTA may be, for example, a stand-alone application implemented on one of First device 606, second device 608, or third device 602. For example, a DTA may be implemented as software or a set of executable instructions which may be stored in storage 657 and executed by control circuitry 653 of a device 602, device 606, or device 608. When executed by control circuitry of one of devices 602, 606, 608, the DTA may instruct control circuitry 623 to perform blockchain and smart contract creation, transfer, and storage functionality described above and below. In some embodiments, any one of first device 606, the processing server 608, or third device 602 may include the hardware and software needed to operate a DBL storage and access functionalities configured as described above or below. For example, each of device 602, device 606, or device 608 may store a copy of DBL 610. In some embodiments, updates to the DBL may be distributed via network 604.

Third device 602 may include elements of a computer device 651. In some embodiments, first device 606 and second device 608 may also include some or all elements described in relation to device 602. As depicted, computer device 651 may be any computer system powered by processor 674. Computer device 651 may receive content and data via input/output (hereinafter "I/O") path. The I/O path may send database records, DBL blocks, and other data to control circuitry 653, which includes processing circuitry 656 and storage 657. Control circuitry 653 may be used to send and receive commands, requests, and other suitable data using the I/O path. The I/O path may connect control circuitry 653 (and specifically processing circuitry 656) to one or more communication paths (described below). I/O functions may be provided by one or more of these communication paths.

Control circuitry 653 may be based on any suitable processing circuitry such as processing circuitry 656. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitry 656 may include display generation circuitry. Display generation circuitry may include display generation functionalities that enable generations for display 672. In some embodiments, control circuitry 653 executes instructions for a user equipment device and/or application stored in memory (i.e., storage 657). Specifically, control circuitry 653 may be instructed by a user equipment device and/or application to perform the functions discussed above and below.

Third device 602 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by third device 602 using, for example, a web browser, a DTA, a desktop application, a mobile application, and/or any combination of the above. Third device 602 may be a cloud client that relies on cloud computing for application delivery, or the media device may have some functionality without access to cloud resources. For example, some applications running on third device 602 may be cloud applications, i.e., applications delivered as a service over the Internet, while other applications may be stored and run on the media device. In some embodiments, a user device may receive content from multiple cloud resources simultaneously. In some embodiments, media devices can use cloud resources for processing operations such as the processing operations performed by processing circuitry. In some embodiments, second device 608 and first device 606 may also be a part of a cloud computing environment. For example, third device 602 may access one or both of second device 608 and first device 606 via a cloud service. In such client/server-based embodiments, control circuitry 653 may include communication circuitry suitable for communicating with one or both of second device 608 and first device 606. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths. In addition, communication circuitry may include circuitry that enables peer-to-peer communication of media devices, or communication of media devices in locations remote from each other.

Memory may be an electronic storage device provided as storage 657, which is part of control circuitry 653. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage 657 or instead of storage 657.

A user, or another system, may send instructions to control circuitry 653 using user input interface 670 of computer device 651. User input interface 670 may be any suitable user interface, such as a remote control, mouse, trackball, keypad, keyboard, touchscreen, touchpad, stylus input, joystick, voice recognition interface, or other user input interfaces. Display 672 may be a touchscreen or touch-sensitive display. In such circumstances, user input interface 670 may be integrated with or combined with display 672. Display 672 may be provided as a stand-alone device or integrated with other elements of computer device 651. Speakers 668 may be provided as integrated with other elements of computer device 651. The audio component of videos and other content displayed on display 672 may be played through speakers 668. In some embodiments, the audio may be distributed to a receiver (not shown), which processes and outputs the audio via speakers 668. In some embodiments, device 651 may include input/outputs other than the user input interface, such as network interface or cloud interface. In one implementation, device 651 may only include input/outputs other than the user input interface and lack may any kind of direct input interface 660.

Computer device 651 may include hardware or software DBL module 666. In some embodiments, DBL module 666 may be used to store DBL and perform other operations, such as block creation and encryption/decryption.

Figure 7:
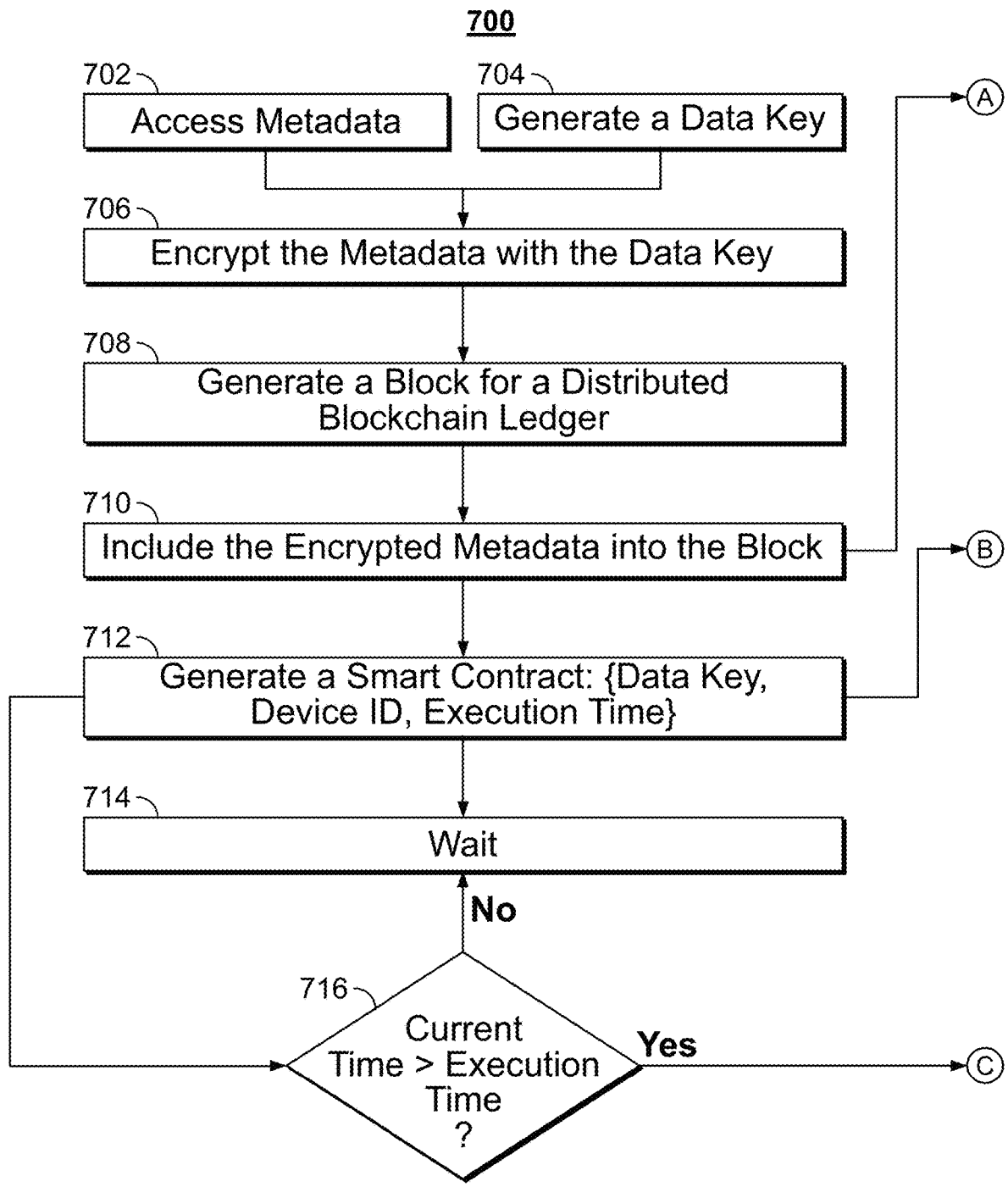
FIG. 7 is a flowchart of a detailed illustrative process for distributing metadata, in accordance with some embodiments of the disclosure.
Figure 7:
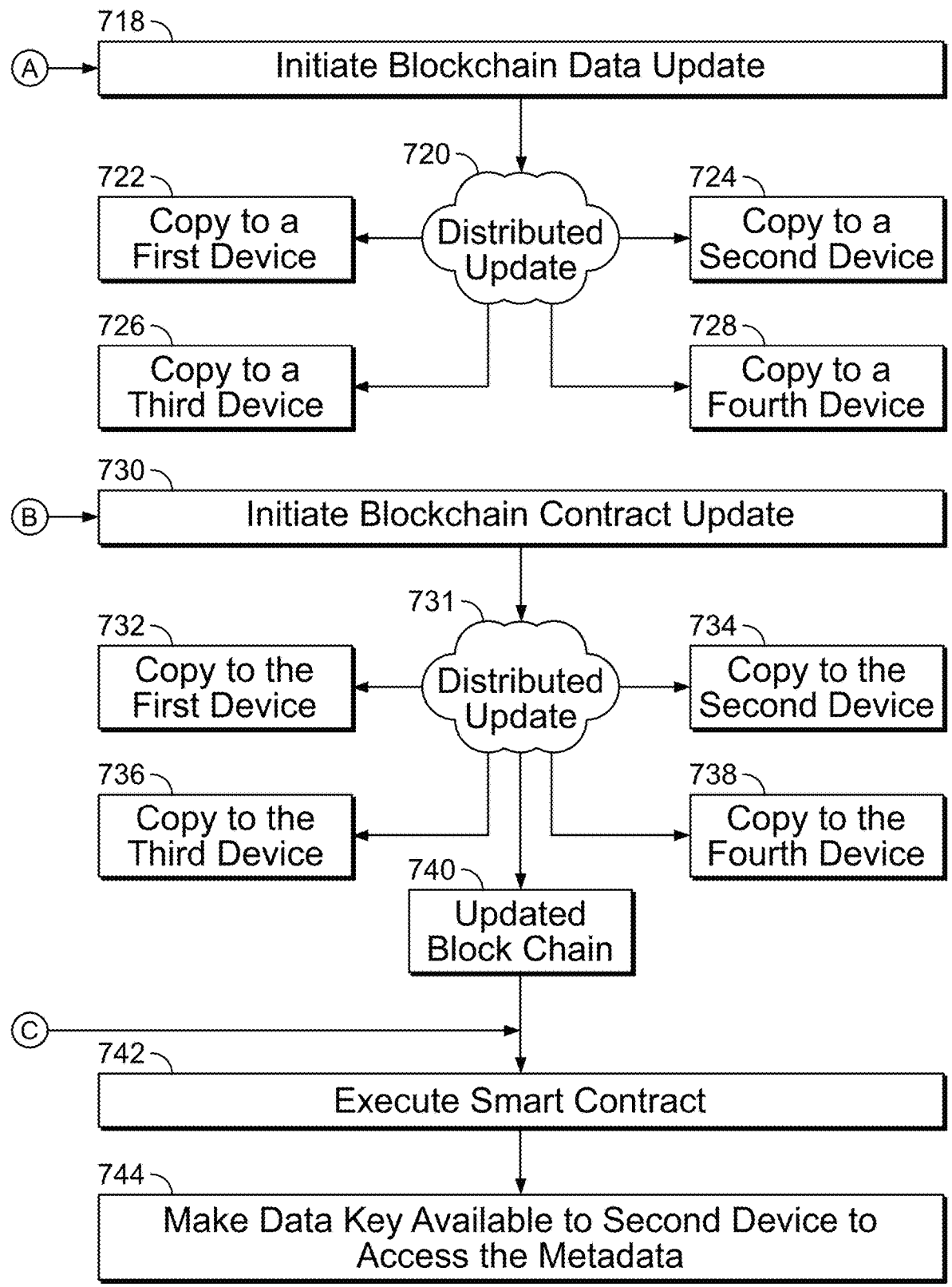

FIG. 7 shows a flowchart of a detailed illustrative process for distributing metadata using a DBL, in accordance with some embodiments of the disclosure. In some embodiments, each step of process 700 can be performed by computer device 651 (e.g., via control circuitry 653) or any of the system components shown in FIG. 6. In another implementation, each step of process 700 can be performed by control circuitry 653 of any of first device 606, second device 608, or third device 602. For example, first device 606 may be a server of a content creator that desires to securely distribute a metadata item related to a media content item. In an example, a data transfer application (DTA) executing on a first device 606 may wish to securely transfer a list of actors scheduled to appear in episode 1 of the show "Game of Thrones" to multiple devices (e.g., devices 608 and 602) that require an assurance that the list of actors will be guaranteed to be received by a certain date.

Process 700 begins at block 702 where control circuitry 653 of a first device 606 accesses a metadata item. For example, control circuitry 653 may access metadata of a newly generated media content item (e.g., a movie, TV show, etc.). In another example, control circuitry 653 may access a review produced by a content aggregation service. Control circuitry 653 may access the media content item from memory 657 or from a third-party source.

At 704, control circuitry 653 may generate a data key. For case of understanding, a symmetrical encryption/decryption key is described herein, however, a public/private key pair may be used instead of the symmetric data key. In some embodiments, control circuitry 653 generates the data key using a random or pseudorandom technique. In another example, control circuitry 653 receives a data key from another service via network 604. At 706, control circuitry 653 encrypts the metadata item with the data key.

At 708, control circuitry 653 generates a block for a DBL. For example, a block may be generated as described with respect to FIGS. 1-4. For example, control circuitry 653 may mine or mint the new block. The block may include appropriate hashes to ensure integrity (e.g., as shown in FIG. 5). At 710, control circuitry 653 may include the encrypted metadata into the generated block (e.g., as a payload). In some embodiments, control circuitry 653 may also include the universal ID of the media asset into the block. At steps 718, control circuitry 653 may transmit the block for storage in the distributed blockchain ledger such that a copy of the distributed blockchain ledger is stored at least by the first computing device and a second computing device. For example, this may be achieved by initiating a blockchain data update. In some embodiments, the blockchain data update is initiated at a first time (e.g., on Dec. 1, 2018).

At 720, the distributed update occurs such that the block generated at step 708 is copied to a first device 722 (e.g., by a device executing steps of process 700). For example, control circuitry 653 may store a copy of the block in local memory 657 as part of a local copy of the DBL. Then, the block may be copied to copies of DBL stored on second device 724, third device 726, and fourth device 728. For example, copies maybe sent from local memory 657 via network 604. In one implementation the block may be sent between devices in a peer-to-peer manner. For example, the fourth device may acquire the copy of the block from any of first device, second device, or third device.

At 712, control circuitry 653 may generate a smart contract to allow a second device to access the unencrypted (e.g., plain text) data of the block. For example, the second device may be a server of media content distributor that needs the list of actors to generate an EPG or to configure a web portal by Jan. 1, 2019. In some embodiments, the smart contract is generated when payment from the second device is verified. In some embodiments, the smart contract is generated when control circuitry 653 receives an indication that the second computing device is subscribed to receive metadata updates from the first computing device. In some embodiments, the generated smart contract includes value that represent a decryption key for the encrypted metadata item (e.g., the data key generates at step 704) and an identifier of the second computing device. In some embodiments, the generated smart contract comprises a date of execution (e.g., Jan. 1, 2019). In this way, the owner of the first device is assured that the data will not be leaked before Jan. 1, 2019, while the owner of the second device is assured that the data will be available on Jan. 1, 2019.

In some embodiments, to assure the execution of the smart contract, it may be stored and transmitted for storage in the DBL. For example, control circuitry 653 may initiate the DBL update at step 730. In some embodiments, the smart contract is written to the same block that was generated at 708 or to any other block of DBL. At 731, the distrusted update occurs such that the smart contract generated at step 712 is copied to a first computing device 732 (e.g., device executing steps of process 700). For example, control circuitry 653 may store a copy of the smart contract in a block in local memory 657 as part of local copy of the DBL. Then, the smart contract may be copied to copies of the DBL stored on second device 734, third device 736, and fourth device 738. For example, copies maybe sent from local memory 657 via network 604. In one implementation the smart contract may be sent between devices in a peer-to-peer manner. For example, the second device may acquire the copy of the block from any of first device, third device, or fourth device. As a result, all copies of DBL are updated at step 740.

In some embodiments, the smart contract is configured to be automatically executed at execution time (e.g., on Jan. 1, 2019) that is later than the first time when the block was created and stored to the DBL (e.g., on Dec. 1, 2018), to provide to the second computing device with the decryption key for the encrypted metadata item.

Steps 714, 716, 742, 744 are described as being executed by control circuitry 653 for case of understanding. However, due to the nature of the smart contract, the may be executed by circuitry of any device with access to the DBL. For example, at step 714, control circuitry 653 (or any other circuitry) may wait until the execution time. At 716, control circuitry 653 may check the current time against the time of execution specified by the smart contract. If the current time is before the time of execution, control circuitry 653 may proceed back to wait at step 714. Otherwise, control circuitry 653 may proceed to step 742.

At 742, control circuitry 653 may execute the smart contract. For example, the code of the smart contract as stored in DBL may be executed. At 744, as the result of execution of the smart contract, the data key may be provided to the second computing device, such that the second computing device may be able to decrypt the payload of the block generated at step 708. For example, the data key of the smart contract may be self-decrypted at the execution time, or a key encryption key (needed to decrypt the data key) may be fetched from a remote source by the operation of execution of the smart contract at the execution time.

Figure 8:
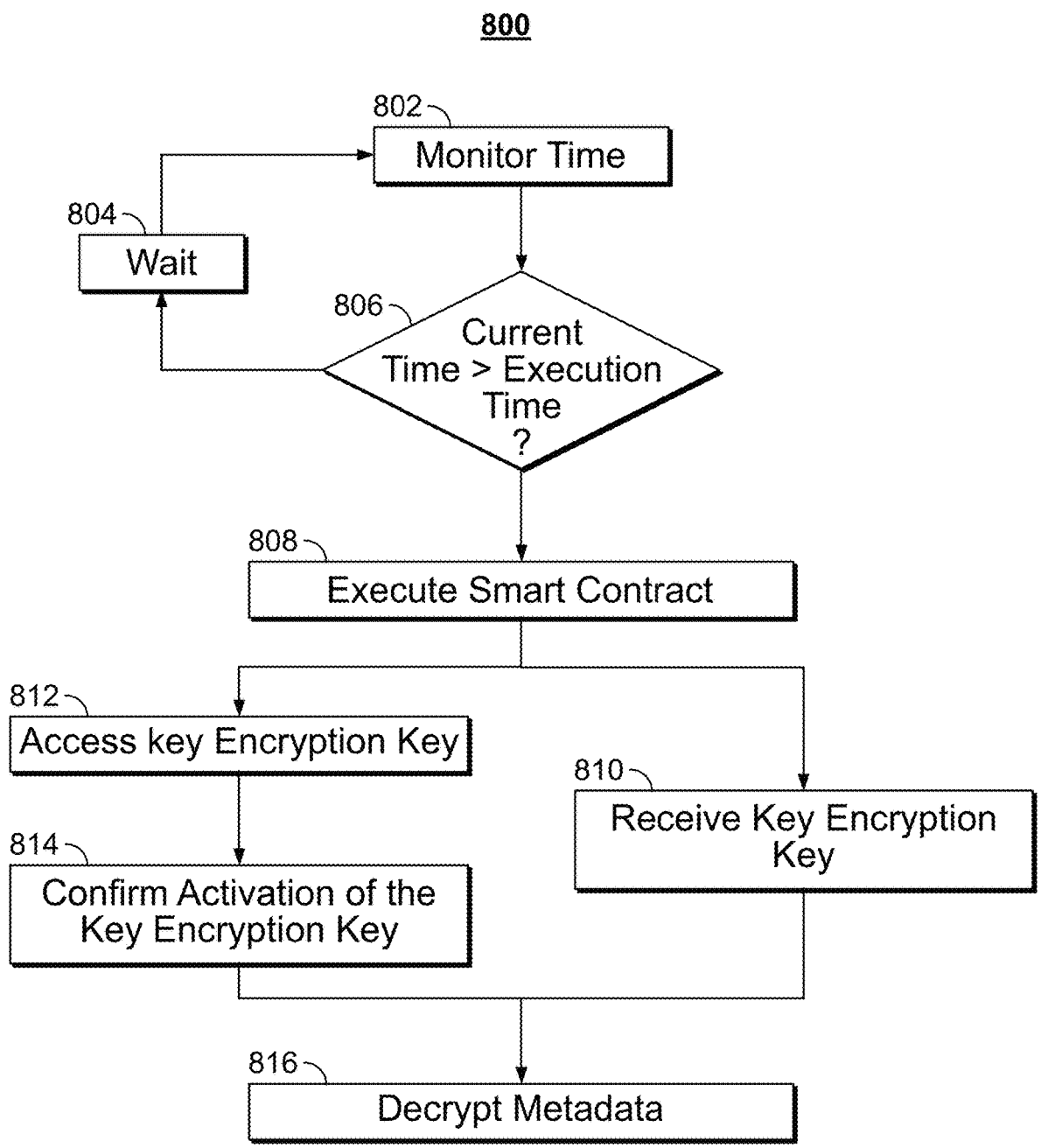
FIG. 8 is flowchart of a detailed illustrative process for smart contract execution, in accordance with some embodiments of the disclosure.

FIG. 8 shows a flowchart of a detailed illustrative process for smart contract execution, in accordance with some embodiments of the disclosure. In some embodiments, each step of process 800 can be performed by computer device 651 (e.g., via control circuitry 653) or any of the system components shown in FIG. 6. In another implementation, each step of process 800 can be performed by control circuitry 653 of any of first device 606, second device 610 or third device 602. For example, second device 608 may be a server of a content distributor that desires to securely use metadata item related to a media content item for generating an EPG or OTT web streaming portal. In some embodiments, process 653 is performed by control circuitry 653 of the second device.

At 802, control circuitry 653 monitors the current time. For example, control circuitry 653 may access time from a secure time source (e.g., UNIX time server.) At 806, control circuitry 653 may check the current time against the time of execution specified by the smart contract (e.g., smart contract generated at step 712). If the current time is before the time of execution, control circuitry 653 may proceed back to wait at step 804. Otherwise, control circuitry 653 may proceed to step 808.

At step 808, control circuitry 653 may execute the smart contract, e.g., by executing code contained in the smart contract. Since the time is correct, execution of the smart contract may result in the second device (e.g., device 608) acquiring the decryption key for an encrypted payload of the block generated at 708.

For example, the smart contract may include a data key that is encrypted with a time-activated encryption, which is configured to self-decrypt at the time of execution (as verified by a secure time source). In this case, at step 812, control circuitry 653 may access the key stored in the smart contract and verify that it was self-decrypted at step 814.

In another example, smart contract may include a data key that is itself encrypted (e.g., with a key encryption key) and require access to the key encryption key to be decrypted. In this case, at step 810, control circuitry 653 may, via the execution of the smart contract, receive the key encryption key for the data key from a third party (e.g., from an escrow service) via network 604.

At step 816, control circuitry 653 may use the data key from the block (that has now itself been decrypted) to decrypt the payload of the block and access the needed metadata (e.g., q cast list for a "Game of Thrones" episode.

Figure 9:
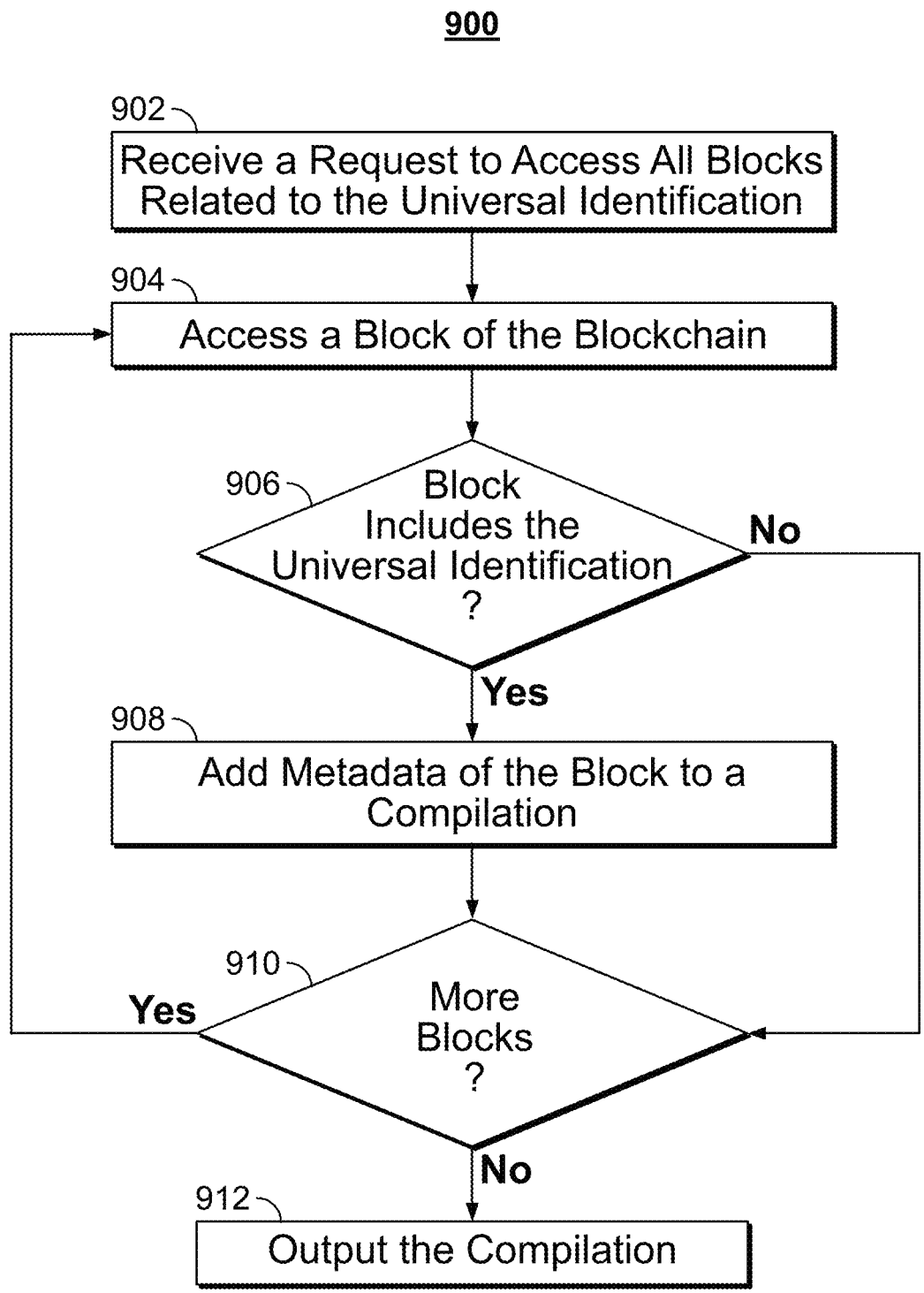
FIG. 9 is a flowchart of a detailed illustrative process for accessing metadata using a blockchain ledger, in accordance with some embodiments of the disclosure.

FIG. 9 shows a flowchart of a detailed illustrative process for accessing metadata using a blockchain ledger, in accordance with some embodiments of the disclosure. In some embodiments, each step of process 900 can be performed by computer device 651 (e.g., via control circuitry 653) or any of the system components shown in FIG. 6. In another implementation, each step of process 900 can be performed by control circuitry 653 of any of first device 606, second device 608 or third device 608. For example, any device with access to the DBL as described above, may use the DBL to access full metadata for a certain media content item.

At 902, control circuitry 653 may receive a request (e.g., a user request) to access all metadata related to a certain media content item. For example, control circuitry 653 may receive a request to access metadata from all blocks that have a certain universal ID (related to a certain metadata item.)

At 904, control circuitry 653 may access one of the blocks of the DBL. At 906, control circuitry 653 may check if that block includes a needed universal ID. If not, process 900 skips to step 910. Otherwise process 900 proceeds to step 908.

At 908, control circuitry 653 may add metadata of the current block to a compilation. In some embodiments, this happens only if the metadata is unencrypted or if the control circuitry 653 has access to a needed decryption key (e.g., in the personal key wallet stored in memory 657).

At 910, control circuitry 653 checks whether more blocks are available from DBL. If so, control circuitry 653 may return to 904 and repeat steps 906-908 for a new block. Otherwise, process 900 proceeds to 912. At 912, control circuitry 653 may output the compiled metadata in a familiar format (e.g., as one web page listing all relevant metadata such as title, actors, years of release, poster, etc.).

It should be noted that processes 700-900 or any step thereof could be performed on, or provided by, any of the devices shown in FIG. 6. For example, the processes may be executed by control circuitry 653 (FIG. 6) as instructed by a DTA. In addition, one or more steps of a process may be omitted, modified, and/or incorporated into or combined with one or more steps of any other process or embodiment (e.g., steps from processes 800 and 900 may be combined with steps from process 700). In addition, the steps and descriptions described in relation to FIGS. 7-9 may be done in alternative orders or in parallel to further the purposes of this disclosure. For example, each of these steps may be performed in any order or in parallel or substantially simultaneously to reduce lag or increase the speed of the system or method.

A DTA may be a stand-alone application implemented on a media device or a server. The DTA may be implemented as software or a set of executable instructions. The instructions for performing any of the embodiments discussed herein of the DTA may be encoded on non-transitory computer readable media (e.g., a hard drive, random-access memory on a DRAM integrated circuit, read-only memory on a BLU-RAY disk, etc.) or transitory computer readable media (e.g., propagating signals carrying data and/or instructions). For example, in FIG. 6 the instructions may be stored in storage 668 and executed by control circuitry 653 of a computer device 661.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for securely distributing metadata using a blockchain, the method comprising:
   accessing a universal identifier for a media asset;
   identifying a current version of a distributed blockchain ledger comprising a plurality of blockchain ledger blocks, wherein each respective blockchain ledger block of the plurality of blockchain ledger blocks comprises (a) respective metadata for the media asset, (b) the universal identifier, and (c) an indication that the respective metadata is available after a current date, wherein a plurality of different content providers add at least a subset of blocks of the plurality of blockchain ledger blocks to the distributed blockchain ledger at different times, and wherein the respective metadata comprises spoiler information;
   based at least in part on receiving a user-interface input to access the respective metadata after the current date:
      searching the current version of the distributed blockchain ledger;
      identifying the plurality of blockchain ledger blocks;
      extracting the respective metadata from each respective identified blockchain ledger block of the plurality of blockchain ledger blocks;
      compiling the respective metadata to generate a compilation of metadata;
      providing the compilation of metadata to an electronic programming guide or over-the-top streaming website after the current date, wherein the electronic programming guide or over-the-top streaming website receives the spoiler information after the current date; and
      generating for display the compilation of metadata.

2. The method of claim 1, wherein a particular content provider of the plurality of different content providers acts as a central authority for universal identifiers, the method further comprising:
   transmitting a conventional identifier of the media asset to the particular content provider; and
   wherein the accessing the universal identifier for the media asset comprises receiving the universal identifier from the particular content provider.

3. The method of claim 1, wherein a particular block of the distributed blockchain ledger was added by a particular content provider of the plurality of different content providers;
   wherein a portion of respective metadata associated with the particular block is encrypted by the particular content provider using a private key; and
   wherein the respective metadata is authenticated by members of a community associated with the distributed blockchain ledger using a public key corresponding to the private key.

4. The method of claim 3, wherein the particular block was added to the distributed blockchain ledger based on:
   determining that a number of the members of the community that have verified the respective metadata associated with the respective blockchain ledger block meets or exceeds a threshold number.

* * * * *